United States Patent [19]

Papritz et al.

[11] Patent Number: 4,838,671
[45] Date of Patent: Jun. 13, 1989

[54] STEREO MICROSCOPE AND STEREO CHANGER

[75] Inventors: Franz Papritz; Hansruedi Widmer, both of Niederscherli, Switzerland

[73] Assignee: Haag-Streit AG, Liebefeld, Switzerland

[21] Appl. No.: 262,261

[22] Filed: Oct. 20, 1988

Related U.S. Application Data

[63] Continuation of Ser. No. 19,203, Feb. 26, 1987, abandoned.

[30] Foreign Application Priority Data

Mar. 14, 1986 [CH] Switzerland .................... 01060/86

[51] Int. Cl.[4] ................. G02B 21/22; G02B 27/22
[52] U.S. Cl. ............................... 350/516; 350/130; 350/145; 350/287
[58] Field of Search ............ 350/516, 515, 514, 130, 350/131, 137, 145, 287

[56] References Cited

U.S. PATENT DOCUMENTS

| | | | |
|---|---|---|---|
| 2,406,526 | 8/1946 | Bennett et al. | 350/515 |
| 3,173,984 | 3/1965 | Vogl . | |
| 4,009,526 | 3/1977 | Abe et al. | 350/516 |
| 4,674,845 | 6/1987 | Matsumura | 350/516 |

FOREIGN PATENT DOCUMENTS

| | | |
|---|---|---|
| 0072652 | 2/1983 | European Pat. Off. . |
| 0090982 | 10/1983 | European Pat. Off. . |
| 3212691 | 10/1983 | Fed. Rep. of Germany ...... 350/516 |
| 388655 | of 1965 | Switzerland . |
| 399771 | of 1965 | Switzerland . |
| 1075218 | 2/1984 | U.S.S.R. .............................. 350/286 |
| 907679 | 10/1962 | United Kingdom ................ 350/516 |
| 928205 | 6/1963 | United Kingdom ................ 350/516 |
| 1401003 | 7/1975 | United Kingdom . |

Primary Examiner—Jon W. Henry
Attorney, Agent, or Firm—Marks Murase & White

[57] ABSTRACT

Behind of the front objective, in the region of both parallel axes of the beams of rays of the microscope is disposed a slewable optical prismatic body with two plane parallel front faces and two opposite inclined, parallel refractive pairs of faces. In a basis position of this prismatic body, the path of the axes of the beams of rays remains uninfluenced by the plane parallel front faces of the optical prismatic body. In a position of the optical body pivoted by 90°, the beams of rays pass through the inclined refractive faces and they experience a transverse displacement. In accordance with the position of the prismatic body one may obtain therefore a greater or smaller stereoscopic angle α. This leads to significantly improved viewing possibilities, more particularly for eye examination.

21 Claims, 3 Drawing Sheets

STEREO MICROSCOPE AND STEREO CHANGER

This application is a continuation of application Ser. No. 07/019,203, filed Feb. 26, 1987 now abandoned.

BACKGROUND OF THE INVENTION

1. Field of the Invention

The present invention relates to a stereo microscope, more particularly for eye examination, with slewable, reflecting and/or refractive means for changing the relative position of the axes of the partial beams of rays and thus for changing the stereoscopic angle.

2. Related Art

Today usual microscopes in this field comprise a fixed stereoscopic angle in the range of 8° to 15°, for example 13°. These instruments permit a stereoscopic viewing of the front section of the eye in an optical section, more particularly under a stereoscopic angle in the 8°–15° range. For observing the rear section of the eye, one normally uses additional lenses. These lenses cancel the refractive power of the cornea and the crystalline lens and permit a partial observation of lateral parts of the cornea and the vitreous body through integrated mirrors. Due to the unfavourable position of the iris, and the pupil, for observation, parts of both observation beams of rays are cut off. In the case of insufficient enlargement of the pupil, strong short-sightedness and in case of lateral observation of peripheral sections of the bottom and vitreous body, a binocular stereoscopic observation of the optical section may be difficult or even impossible because the binocular field of vision becomes very small. Then, only a monocular observation of the optical section or a binocular opthalmoscopy with focal illumination may be executed.

In order to improve the conditions of examination or operation, more particularly of the eye, stereo microscopes as described above, have already been proposed. A microscope of this kind is disclosed in CH-A-399 771 in which each partial beams of rays includes an optical, reflecting body rotating around an axis parallel to the optical axes of the partial beams of rays, this body displacing the partial beams of rays to the side. When the rotation of both optical bodies is coordinated, the stereoscopic angle angle varies as a function of the position of the bodies. This execution has important drawbacks. One must provide two separate, revolving supports for the optical bodies which must be driven from the outside by means of adequate gearings. The bearing of the supports for rotation inside of the tube around an axis parallel to the optical axes of the beams of rays is expensive. In relation to the luminous intensity, the execution is space consuming and the variability of the stereoscopic angle is limited.

SUMMARY OF THE INVENTION

It is an object of the present invention to realize an improved stereo microscope. The stereo microscope comprises slewable, reflecting and/or refractive stereo changer means which are arranged in a mutual rigid position on a common rotor. The axis of the stereo changer means is perpendicular to the axes of the partial beams of rays and lies essentially parallel to or coincident with the plane defined by the axes of the partial beams of rays. The stereo changer means has plural slewing positions and displaces the rays differently in different positions.

This solution permits a compact construction with a particularly favourable relation between consumption of material, space, luminous intensity and ease of manipulation. Particularly favourable conditions exist which permit the optional inclusion of a module used as a stereo-changer. The module may be mounted or separable, the separable module providing the possibility to equip already existing microscopes. The invention relates also to a stereo-changer of this kind in a stereo microscope, more particularly for eye examination, characterized in that in a housing element with a through opening for the partial beams of rays, at least one optical body is arranged for being pivoted in at least two working positions, the optical body displacing differently the partial beams of rays in its working positions.

BRIEF DESCRIPTION OF THE DRAWINGS

The invention will be decribed further by way of an example of execution and of variants of execution of the microscope according to the invention as well as of some examples of applications.

DETAILED DESCRIPTION OF THE INVENTION

Figure 1:
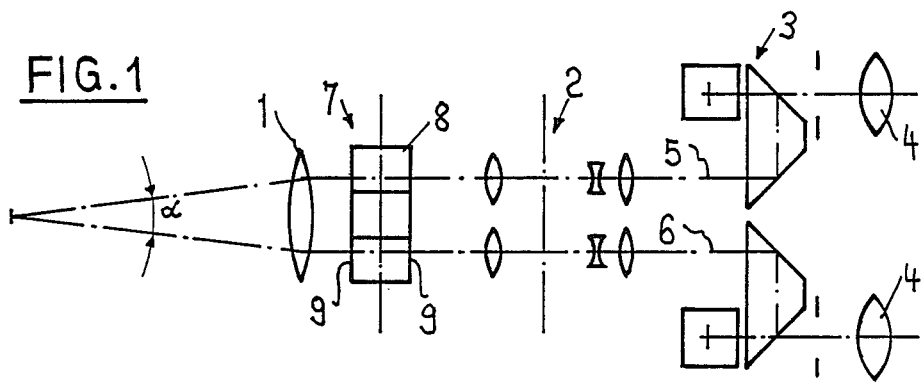
FIGS. 1 and 2 show schematically the optics of the microscope in two different adjusted positions with large and small stereoscopic angles $\alpha$.
Figure 2:
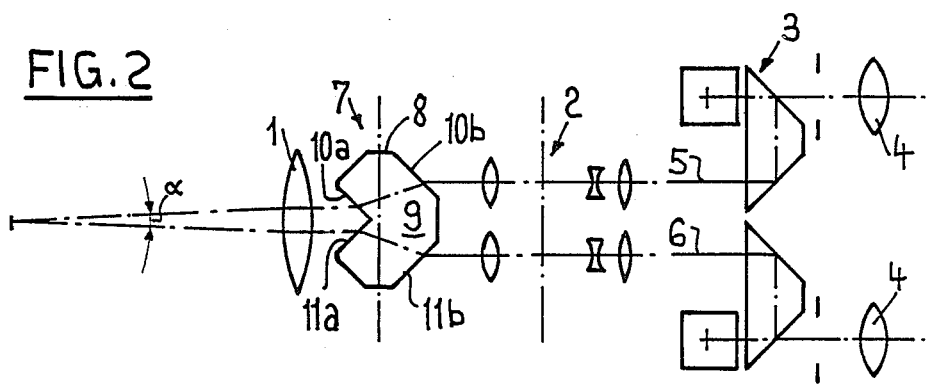

The embodiment illustrated in FIGS. 1 and 2 comprises the usual element like a front objective 1, a magnification changer 2, a binocular tube 3 and oculars 4. These elements 1 to 4 and their functions are known in themselves and they will not be described further. It is noted that the path of the rays in both partial beams of rays, the axes of which are indicated by 5 and 6 in FIGS. 1 and 2, are parallel.

In accordance with the invention, a stereoscopic angle-changer 7 with an optical refractive body 8 is inserted between the front objective 1 and the magnification changer 2. This refractive body 8 may be turned by 90° to lie in one case with parallel front faces 9 perpendicular to the path of the rays (FIG. 1) or with parallel pairs of prism faces 10a and 10b, and parallel pairs of prism faces 11a and 11b inclined toward the partial beams of rays. In the position shown in FIG. 1, the body 8 is ineffective with respect to the path of the axes of the partial beams of rays. The microscope has a stereoscopic angle $\alpha$ of e.g. 13°. If the optical body 8 is in the position tilted by 90° (according to FIG. 2), the distance of the axes in both partial beams of rays 5 and 6 is narrowed in the region between the body 8 and the front objective 1 so that the stereoscopic angle $\alpha$ becomes smaller. As mentioned above, these angles may be of e.g. 13, resp. 4.5°, but is clear that other determined values may be chosen within the above mentioned range. Particular advantages in specialized cases of applications will be discussed later on.

Figure 3:
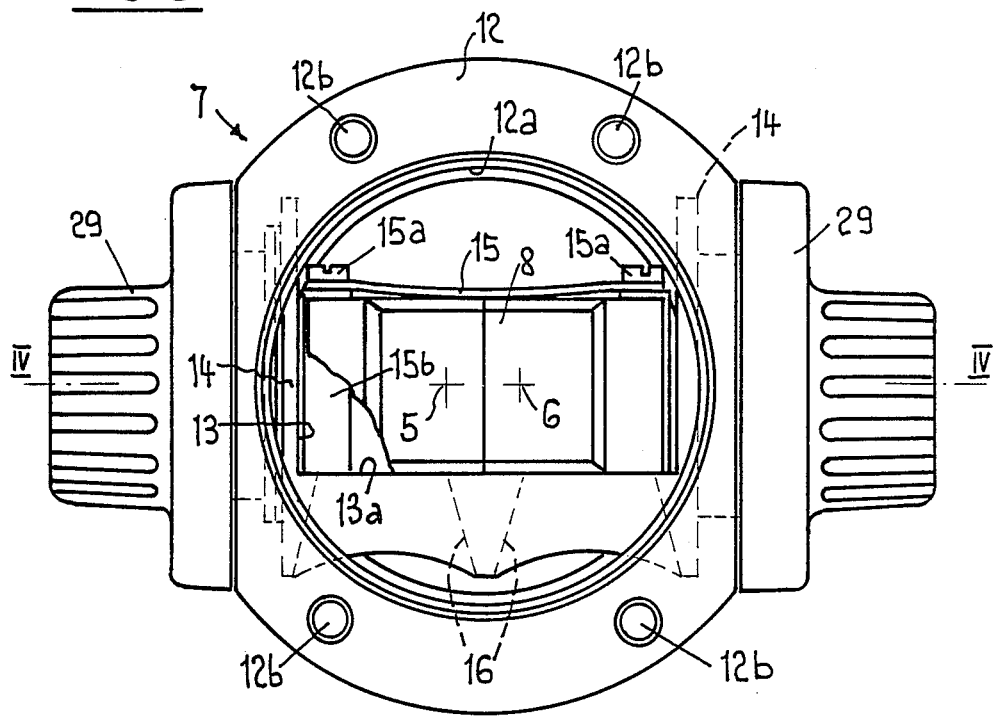
FIG. 3 shows a front view of the construction of a stereoscopic angle-changer executed as an essential part or module of the microscope.
Figure 4:
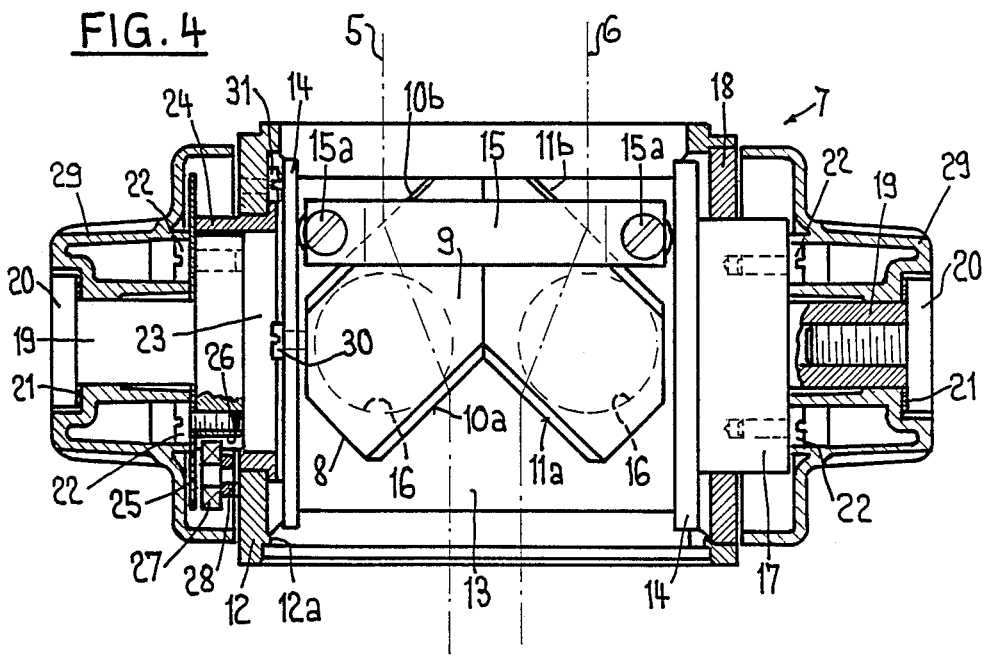
FIG. 4 is a section along line IV—IV of FIG. 3, FIGS. 5 and 6 show the viewing relations at the patient's eye with large and small stereoscopic angle.

FIGS. 3 and 4 show a constructive execution of the stereo-changer 7. In a housing 12 with a through opening 12a is pivotably mounted a rotor as a support for the optical body 8. The rotor comprises in the region of the through opening 12 a milling 13 having amounting surface 13a supported by flanges 14. The optical body 8 is screwed on top of mounting surface 13a by means of a resilient strap 15 and additionally glued as the case may arise. The fixing screws 15a pass through spacers 15b which determine the position of the extremities of the strap. The remaining bridge of the rotor on the side of the milling 13, between the flanges 14, comprises two conical radial holes 16 through which the two beams of rays pass when they go through the plane-parallel faces 9 of the optical body 8 rotated by 90° (according to FIG. 1). A bearing element 17 of the rotor illustrated at the right in FIG. 4 is pivotably mounted in a bearing flange 18. A actuating knob 29 at the right hand side is fixedly coupled to a neck of the axle 19 of the rotor by means of a screw 20 and a spring washer 21 between them. Screws 22 acting as stops are provided for additional security against rotation of the actuating knob 29 on the rotor. A corresponding bearing element 23 of the rotor at the left hand side of the figure is mounted in a bearing bushing 24. To the bearing bushing is screwed a metal sheet 25 which acts as a stop of the bearing bushing 24 and determines the axial position of the rotor. In the bearing element 23 are provided at the periphery two axial grooves 26 angularly mutually displaced of 90°, one of them being illustrated in FIG. 4. In this groove engages a notched roller 27, e.g. a ball bearing which is supported on a spring loaded lever 28. The notched roller 27 catches each time in one of the grooves 26 for determining the two working positions of the rotor, resp. of the optical body 8. To the left range 14 of the rotor is secured a stop screw 30 which cooperates with a stop screw 31 secured to the housing 12. These two screws prevent a rotation of the rotor and consequently of the optical body 8 in the wrong direction. The left flange 14 forms the second stop for ensuring a determined axial position of the rotor. At the left hand side an actuating knob 29 is mounted in a manner similar to the one of the knob at the right hand side. As illustrated only in FIG. 3, the housing 12 comprises four holes 12b passing through in the axial direction of the opening 12a, of the beams of rays, through which mounting screws for coupling of the individual parts of the microscope may be inserted. It is possible to secure the stereoscopic angle changer, by means of longer screws, to the objective or by means of shorter screws, to secure the objective only to the magnification-changer.

Figure 5:
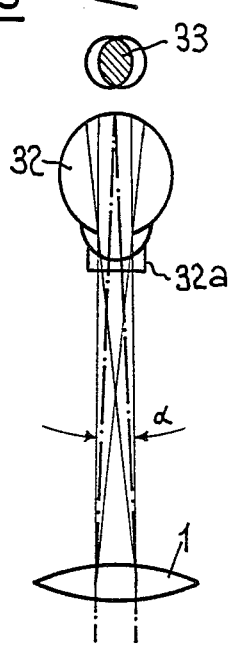
Figure 6:
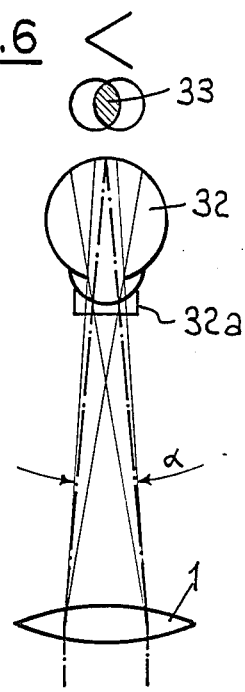

FIGS. 5 and 6 show schematically the paths of the rays between the frontal objective 1 and the eye 32 to be examined, the eye bearing the contact lens 32a. FIG. 5 shows that in the case of a small stereoscopic angle α the monocular visual fields of both partial beams of rays overlap to a great extent. Thus, the binocular visual field 33 is great as shown at the top of FIG. 5. The conditions are different with a great stereoscopic angle α, the corresponding binocular visual field of which is small as shown in FIG. 6.

Figure 7:
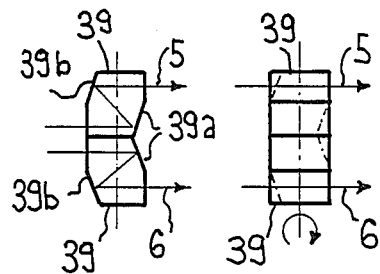
FIGS. 7 and 8 show schematically variants of execution.
Figure 8:
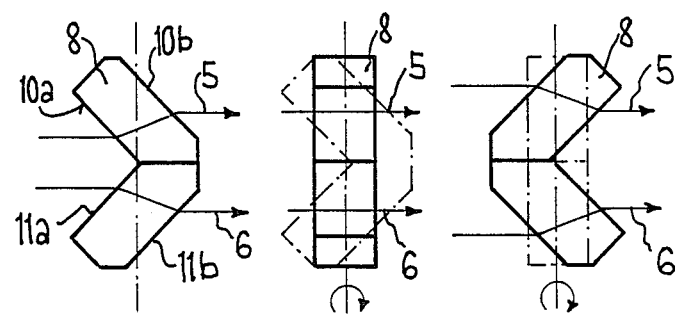

FIGS. 7 and 8 show variants of executions whereby each Figure shows at least two working positions. It is assumed in all examples that the direction of the path of rays goes from left to right.

FIG. 7 shows a variant with prisms 39 which in accordance with FIGS. 1 and 2 can be pivoted from an effective position according to the left of FIG. 7 to an ineffective position according to the right part of FIG. 7. The prisms comprise mirrors, reflecting faces 39a and 39b through which the axes of the beams of rays 5 and 6 in the case of the effective position of the prisms are displaced towards the outside so that a small stereoscopic angle results. In accordance to the right part of FIG. 7, the axes of the beams of rays 5 and 6 pass through the prisms uninfluenced which results in a great stereoscopic angle.

FIG. 8 shows a variant with an optical prism or body 8 in accordance with FIGS. 1 and 2. However, the optical body has somewhat different dimensions and it can be brought in three different positions as show in FIG. 8. The central and left positions correspond to the ones according to FIG. 1, resp 2 and the effects described in relation with FIGS. 1 and 2 take place. If the body 8 is brought in the opposite position illustrated in the right part of FIG. 8, the beams of rays are refracted towards the inside instead of the outside and it results a greater stereoscopic angle than the one according to the central part of FIG. 8. Hence, three stereoscopic angles are at disposal and may be easily choosen.

Finally, some typical examples of applications for the small stereoscopic angle of e.g. 4.5° are indicated. In the case of examination of corneal endothelium in the area of the Purkinje's mirror, the normal stereo microscope with an observation angle of 13° permits only a monocular examination. If one changes to the small stereoscopic angle of 4.5°, one sees that the endothelium may be much better examined, not because of the modest stereoscopic effect but because the binocular visual acuity of the observer is significantly better than the monocular one. The same conditions apply for the examination of the rear face of the crystalline lens in the case of narrow pupil.

The lateral parts of the background of the eye are often seen only monocularly by means of the three mirrors contact lenses. In this case, an examination with the small stereoscopic angle permits the binocular observation of a great binocular field, however with a smaller stereoscopy but better binocular visual acuity.

In case of examination of the papilla and corneal spot, the examination under a stereoscopic angle of 4.5° gives a greater binocular field. In case of search of the vitreous body and bottom this may be advantageous, particularly in case of strong nearsightedness, where the binocular field is significantly smaller than in the case of emmetrope eyes. If something of interest has been found, one changes to the examination with 13° in order to achieve as far as possible a good stereoscopic examination of the optical section.

Similar considerations are valid for the examination and treatment in relation with a laser irradiation of the eye.

Although the invention has been described above principally in relation with the examination of the eye, corresponding measures applied to the microscopes for other applications may be of interest. This is generally true for microscopes with great frontal distance, that is always in the case when the observed objects must also be treated and/or auxiliary apparatuses are to be inserted between the microscope and the object. By a stereo microscope without magnification-changer 2, the stereo-changer 7 is preferably disposed directly between the objective of fixed or variable magnification and the binocular tube.

We claim:

1. A stereo microscope for viewing an object comprising:
    an objective means for creating an image of an object;

a pair of oculars for transferring the image to a viewer's eye, said oculars having optical axes aligned substantially parallel to an optical axis of said objective and each ocular receiving a partial beam of rays from said objective means;

a stereo changer means disposed between said objective means and sid oculars for changing a stereoscopic angle of the microscope, said stereo changer means comprising:

an optical element rotatable about a first axis substantially perpendicular to said objective means' and oculars' optical axes and having a first and a second working position;

wherein said optical element, when in said first working position, displaces transmitted beams of rays from each other by a first displacement distance; and wherein said optical element, when in said second working position displaces transmitted beams of rays from each other by a second displacement distance different from said first displacement distance.

2. The stereo microscope according to claim 1, wherein said first displacement distance is zero.

3. A stereo microscope according to claim 2, wherein said optical element has a third working position and said optical element displaces transmitted beams of rays by a third displacement distance when in said third working position;

wherein said second displacement distance is greater than said first displacement distance and said third displacement distance is less than said first displacement distance.

4. A stereo microscope according to claim 1, wherein said optical body is a reflective body.

5. A stereo microscope according to claim 1, wherein said optical body is a refractive body.

6. A stereo microscope according to claim 1, wherein said optical element comprises:

a plural sided optical body rotatable about said first axis and having a wedge shaped recess formed therein, said wedge shaped recess having an apex at a central axis of said optical body;

a pair of optically active faces, disposed along surfaces of said wedge shaped recess, for laterally displacing partial beams of rays from each other; and wherein said optical body has a pair of optically inactive parallel faces disposed substantially perpendicular to said optically active faces.

7. A stereo microscope according to claim 1, further comprising a magnification-changer;

wherein said stereo changer means is arranged between said objective means and said magnification-changer.

8. A stereo microscope according to claim 1, further comprising a binocular tube disposed near said oculars;

wherein said stereo changer means is arranged between said objective means and said binocular tube.

9. A stereo microscope according to claim 1, wherein said stereo changer means is contained within a module of the microscope.

10. A stereo microscope according to claim 9, wherein said module is removably secured to the microscope.

11. Changer according to claim 1, wherein said stereo changer is contained in a module adapted to be removably coupled with a stereo microscope.

12. A modular stereo angle changer for use with a stereoscopic microscope comprising optical means rotatable about an axis to one of first and second working positions for displacing from each other by first and second displacement distances, respectively, parallel beams of rays directed through said optical means in a direction perpendicular to said axis.

13. A modular stereo angle changer as recited in claim 12, wherein said optical means includes an optical element having a first pair of parallel opposing faces parallel to said axis, and second and third pairs of parallel opposing faces, each of said second and third pairs of opposing faces being disposed at an equal angle to said axis.

14. A modular stereoangle changer as recited in claim 13, wherein each of said second and third pairs of parallel opposing faces is orthogonal to said first pair of parallel opposing faces.

15. A modular stereo angle changer as recited in claim 13, wherein each face of said second and third pairs of parallel opposing faces is optically refractive.

16. A modular stereo angle changer as recited in claim 13, wherein each face of said second and third pairs of parallel opposing faces is optically reflective.

17. A modular stereo angle changer as recited in claim 13, wherein each of said first pair of parallel opposing faces is optically transparent.

18. A modular stereo angle changer as recited in claim 13, wherein said optical element further has fourth and fifth pairs of parallel opposing faces disposed axially adjacent said second and third pairs of parallel opposing faces, respectively.

19. A modular stereo angle changer as recited in claim 18, wherein adjacent faces of said second and fourth pairs of parallel opposing faces on one side of said optical element are axially reversed from adjacent faces of said second and fourth pairs of parallel opposing faces on the other side of said optical element; and wherein adjacent faces of said third and fifth pairs of parallel opposing faces on one side of said optical element are axially reversed from adjacent faces of said third and fifth pairs of parallel opposing faces on the other side of said optical element.

20. A modular stereo angle changer as recited in claim 19, wherein said second and third pairs of parallel opposing faces are optically reflective and said fourth and fifth pairs of parallel opposing faces are optically transparent.

21. A modular stereo angle changer as recited in claim 20, wherein each of said second, third, fourth and fifth pairs of parallel opposing faces is orthogonal to said first pair of parallel opposing faces.

* * * * *